United States Patent
Canales Vázquez et al.

(10) Patent No.: US 11,447,423 B2
(45) Date of Patent: Sep. 20, 2022

(54) METHOD FOR OBTAINING CERAMIC BARBOTINE FOR THE PRODUCTION OF FILAMENTS FOR 3D-FDM PRINTING, BARBOTINE OBTAINED USING SAID METHOD, AND CERAMIC FILAMENTS

(71) Applicant: UNIVERSIDAD DE CASTILLA LA MANCHA, Albacete (ES)

(72) Inventors: Jesús Canales Vázquez, Albacete (ES); Gloria Begoña Sánchez Bravo, Albacete (ES); Juan Ramón Marín Rueda, Albacete (ES); Vicente Yagüe Alcaraz, Albacete (ES); Juan José López López, Albacete (ES)

(73) Assignee: UNIVERSIDAD DE CASTILLA LA MANCHA, Albacete (ES)

( * ) Notice: Subject to any disclaimer, the term of this patent is extended or adjusted under 35 U.S.C. 154(b) by 954 days.

(21) Appl. No.: 16/098,510

(22) PCT Filed: Apr. 4, 2017

(86) PCT No.: PCT/ES2017/070202
§ 371 (c)(1),
(2) Date: Nov. 2, 2018

(87) PCT Pub. No.: WO2017/191340
PCT Pub. Date: Nov. 9, 2017

(65) Prior Publication Data
US 2021/0238099 A1    Aug. 5, 2021

(30) Foreign Application Priority Data
May 5, 2016   (ES) ................. ES201630581

(51) Int. Cl.
*C04B 35/56*     (2006.01)
*B33Y 70/00*     (2020.01)
*C04B 35/565*    (2006.01)
*C04B 35/622*    (2006.01)
*C04B 35/634*    (2006.01)

(52) U.S. Cl.
CPC .......... *C04B 35/5611* (2013.01); *B33Y 70/00* (2014.12); *C04B 35/565* (2013.01); *C04B 35/6225* (2013.01); *C04B 35/62236* (2013.01); *C04B 35/62259* (2013.01); *C04B 35/62281* (2013.01); *C04B 35/6342* (2013.01); *C04B 2235/61* (2013.01)

(58) Field of Classification Search
CPC ............. B33Y 70/00; C04B 35/62281; C04B 35/6342; C04B 35/6363; C04B 35/632; C04B 35/634; C04B 35/63464; C04B 35/636; C04B 35/6264; C04B 35/63416; C04B 2235/6026
See application file for complete search history.

(56) References Cited

U.S. PATENT DOCUMENTS

| | | | |
|---|---|---|---|
| 5,997,795 A * | 12/1999 | Danforth | ................. C04B 38/00 419/36 |
| 8,568,649 B1 | 10/2013 | Balistreri et al. | |
| 2018/0298215 A1* | 10/2018 | Andersen | ............... A61C 13/00 |

FOREIGN PATENT DOCUMENTS

| | | |
|---|---|---|
| CN | 1203206 | 12/1998 |
| CN | 104163634 | 11/2014 |
| CN | 104526838 | 4/2015 |
| CN | 104959613 | 10/2015 |
| KR | 1997-0005878 | 4/1997 |

OTHER PUBLICATIONS

Wu et al. Fabrication of Composite Filaments with High Dielectric Permittivity for Fused Deposition 3D Printing. Materials 2017, 10, 1218.*
Xianfeng, Y., et al., "Water-Soluble Binder System Based on Poly-Methyl Methacrylate and Poly-Ethylene Glycol for Injection Molding of Large-Sized Ceramic Parts," International Journal of Applied Ceramic Technology, vol. 10, pp. 1-9, 2012.
Onagoruwa, S., et al., "Fused Deposition of Ceramics (FDC) and Composites," Pro SFF, Texas, pp. 224-231, 2001.
Allahverdi, M., et al., "Processing of Advanced Electroceramic Components by Fused Deposition Technique," Journal of the European Ceramic Society, vol. 21, No. 10, pp. 1485-1490, 2001.

* cited by examiner

*Primary Examiner* — Noah S Wiese
(74) *Attorney, Agent, or Firm* — Carmody Torrance Sandak & Hennessey LLP

(57) ABSTRACT

The present invention is a method for obtaining a ceramic slurry for the production of filaments for 3D FDM printing, comprising adding a polysaccharide, a glycol or an ethanolamine as a gelling agent to a suspension of ceramic material in order to produce said ceramic slurry. The invention also comprises the green body obtained from said slurry and the ceramic filament extruded from the green body.

9 Claims, No Drawings

METHOD FOR OBTAINING CERAMIC BARBOTINE FOR THE PRODUCTION OF FILAMENTS FOR 3D-FDM PRINTING, BARBOTINE OBTAINED USING SAID METHOD, AND CERAMIC FILAMENTS

TECHNICAL FIELD

The invention is a method for producing filaments for 3D printing using the ceramic material fused deposition modelling technique, with application in the medical and technological sector, or interior design and the production of necessary everyday implements.

BACKGROUND OF THE INVENTION

Rapid prototyping techniques have undergone exceptional development in recent years, especially due to the surge in 3D printing techniques. These techniques make it possible to produce parts quickly and effectively, avoiding subsequent machining processes, in a relatively direct and simple manner from the design of the part by specific software.

There are several 3D printing technologies such as stereolithography (SLA), selective laser sintering (SLS) or fused deposition modelling (FDM). Although the first two offer great versatility and a high level of finish of the parts, FDM has a wider exposure in the market due to the low cost of the printer and of the materials used.

The FDM technique is based on the ability to deposit fine lines of molten material which, upon cooling, give rise to the piece predesigned by the software. It is therefore a technique that can be found in applications with many thermoplastic polymers such as polylactic acid (PLA), acetonitrile-butadiene-styrene (ABS) and nylon. However, it is very limited in the case of ceramic materials, since they do not have glass transitions and melting points in the temperature ranges usually employed in the process (up to 250-270° C.) and therefore they cannot undergo a FDM process directly. Thus, the combination of the ceramic to be obtained with a thermoplastic is required. The resulting composite can undergo the FDM printing process and, after heat treatment, the organic waste is removed leaving only the ceramic piece.

The production of ceramic pieces by 3D FDM is described in the art, but always intended for low-temperature applications and with a ceramic load of approximately 50% by weight (I. Zein et al., "Fused deposition modeling of novel scaffold architectures for tissue engineering applications "Biomaterials 23, p. 1169-1185, 2002; S. J. Kalita et al.," Development of controlled porosity ceramic composite scaffolds via fused deposition modeling," Materials Science and Engineering C 23, p. 611-620, 2003). However, the products resulting from these methods exhibit no mechanical stability at high temperatures and collapse.

The ceramic or metallic texture can be obtained with other products (pore-lay series, Ira-brick) but also collapse when the temperature increases http://ira3d.com/shop/ira-brick/?lang=en)

Only one ceramic product that exhibits this stability after the treatment has been described in the art, which has been marketed under the name Lay-Ceramic. The filament it uses is clay with a contraction coefficient of 20-25% according to the information shown on the product website (https://www.matterhackers.com/store/3d-printer-filament/layc-eramic-3.00mm). This high contraction is due to the fact that the filament has a content of organic components of up to 40%, which is very high, in addition to the fact that it probably does not incorporate the appropriate ones. The product is restricted to clays and cannot be extended to other ceramic materials requiring a sintering process to form the final piece.

Rutgers University published a series of papers in which ceramic pieces were obtained via 3D printing using a specially modified Stratasys printer (M. Allahverdi et al., "3D Modeller", Journal of the European Ceramic Society 21, 2001, 1485-1490). One of the papers describes the development of a binder for 3D printing from a combination of polyolefins combining binding, plasticizing and adhesive properties, and that decomposes above 300° C. (T. F. McNulty, Mohammadi, A. Bandyopadhyay, S. C. Danforth and A. Safari, "Development of a Binder Formulation for Fused Deposition of Ceramics (FDC)", Rapid Prototyping Journal 4 [4], p. 144-50, 1998). This high decomposition temperature also necessarily involves high printing temperatures, making it difficult to use in conventional 3D printers for which the kits distributed in the market are intended.

In the preparation of a green body, which should be easily mouldable, the use of various dispersing agents depending on the ceramic to be processed is required. In other words, each ceramic system requires a preliminary study to obtain a green body that produces filaments for subsequent use in FDM.

Within the scope of the present application, "green body" is defined as the mixture of a ceramic material with suitable organic agents forming a mouldable composite material readily extrudable by the printer.

Application KR 20150042660 A discloses a blend of PLA with ceramic for 3D printing. Once again, a stable piece is not obtained. Reproducing the method in the inventors' laboratory gives rise to pieces with ceramic appearance, but they do not retain their shape at high temperature because no gelling agent or binder is used that enables retention of the structure at temperatures above the glass transition of the thermoplastic. Therefore, the document should be merely considered a disclosure in the same technological field that provides no teaching suggested by the present invention.

CN103922755 A discloses the invention of a material and a process for 3D printing of ceramic parts. The process includes mixing the ceramic with three different binders in the solid state, being one of them an inorganic compound, therefore the producing process is similar to that of molten salts. The result is that pieces can finally be printed by 3D printing but with a much higher temperature requirement than conventional FDM temperatures, limiting its use.

The problem raised by the technique is the obtainment of a filament of ceramic material with a high ceramic load for 3D FDM printing of stable pieces. The solution proposed by the present invention is a sludge or slurry that incorporates a gelling agent during processing thereof.

DESCRIPTION OF THE INVENTION

The invention is a method for preparing a ceramic slurry for producing filaments for 3D FDM printing, which comprises adding a polysaccharide, a glycol or an ethanolamine as a gelling agent to a suspension of ceramic material.

Within the scope of the present invention, "ceramic material" is defined as an inorganic material, typically metallic elements combined with non-metallic elements by means of preferably ionic bonds, electrically insulating and thermal and with very high mechanical resistance, an also high Young's modulus and a brittle fracture mode that reflects its non-plasticity, and perfectly characterised in the art.

Within the scope of the present invention, "slurry" is understood to be a homogeneous ceramic emulsion and organic agents with high viscosity, typically 0.1-1 Pa·s and stable over time.

In a particular aspect, the invention comprises preparing a suspension of a ceramic material, preferably between 30-70% by weight of the total solution, in at least one alcohol and/or a $C_1$-$C_8$ chain ketone; adding a polysaccharide, a glycol or an ethanolamine as a gelling agent; adding a vinyl resin or polyalkyl carbonate as a binder; adding a phthalate, terpineol, polyolefin, thermoplastic or mixtures thereof as a plasticizing agent; and heating to a temperature of 60-150° C. to obtain said ceramic slurry.

In a particular aspect of the method, the sequence of addition of the components after the ceramic changes order or is simultaneous, and can also be heated from the start.

In a highly preferred aspect, said gelling is present in a ratio of 1:4 to 1:20, more preferably 1:6 to 1:10, by weight of the ceramic. In another preferred aspect said polysaccharide is selected from methyl cellulose, ethyl cellulose, hydroxypropyl methyl cellulose, pectin or agar. In another preferred aspect, said glycol is selected from ethylene glycol, propylene glycol and butylene. In another, said ethanolamine is selected from monoethanolamine, ethanolamine, diethanolamine and triethanolamine.

In another preferred aspect, said binder is present in a ratio of 1:3 to 1:20, preferably 1:3 to 1:8, by weight of the ceramic. In another highly preferred aspect, said vinyl resin binder is polyvinyl alcohol, polyvinyl or polyvinyl butyral.

In another very preferred aspect, said plasticizing agent is present in a ratio of 1:5 to 1:10, preferably 1:6 to 1:9, also by weight of the ceramic. In a preferred aspect, this polyolefin is polyethylene, polypropylene or polybutylene. In a further aspect, said thermoplastic is polylactic acid (PLA) or acrylonitrile butadiene styrene (ABS).

Optionally, a lubricant is also added before the heating stage that facilitates printing of the filament and the texture of the piece, preferably wax or paraffin, in a ratio of 1:36 to 1:200 by weight of the ceramic. Its inclusion is highly recommended for the inventors' extruder and all the examples in which the green body has been extruded include it; however, other systems can dispense of said lubricant to obtain the filaments of the invention.

Heating between 60° C. and 150° C. enables homogenisation of the mixture and also gives rise to the partial removal of the organic solvents. Therefore the proportion of the ceramic increases relatively to the other components as the obtainment method advances.

A proportion of gelling agent lower than 1:20 with respect to the ceramic gives rise to a heterogeneous green body that is not suitable for the subsequent extrusion and use thereof in 3D FDM printing. If this ratio is higher than 1:4, the resulting green body can be extruded and fed to the printer, but the resulting pieces are deformed after the heat treatment.

The incorporation of the gelling agent ensures good dispersion of the ceramic particles regardless of their nature. It has been observed that the gelling agent makes the particle distribution in the green body is homogeneous and stable over time in a simple and effective way so that the method is expandable to a wide variety of ceramic materials such as oxides and carbides. In summary, it facilitates processing of the filaments from the green body obtained from said slurry, filaments that combine elasticity and plasticity suitable for use in conventional 3D FDM printers.

Proportions lower than 1:20 of binding agent will give rise to green bodies that lose their shape during the heat treatment, while those obtained with proportions higher than 1:3 will be extremely hard and brittle, incompatible with the subsequent 3D printing process.

Quantities below 1:10 of plasticizing agent renders the plasticity of the green body insufficient for the subsequent extrusion thereof in the form of a filament and use in FDM printing, while quantities above 1:5 will give rise to easily extrudable pieces but that, due to the excess organic matter, will not retain their shape after the heat treatment. The effect of the plasticizer is, to a certain extent, antagonistic to that of the binder: very high amounts give rise to an extrudable body but that does not retain its shape after the printing process.

The resulting slurry is allowed to cool to room temperature, giving rise to a flexible body that can be easily extruded to form threads or filaments, easily manageable and storable for 3D FDM printing in conventional printers.

The inclusion of the gelling agent according to the invention allows the ceramic particles to remain dispersed in a fluid such as slurry during the formation of the green body. It also enables the creation of an interconnected network structure of the ceramic particles which, with the addition of binding and plasticizing agents, gives rise to a green body with a ceramic load of up to 85% by weight. This green body can be extruded, wound and subsequently used in conventional 3D printers. The resulting structures maintain stability at high temperatures; up to 1,600° C. in the case of $Al_2O_3$ or carbides and in any case up to 0.75 $T_m$ of ceramic material ($T_m$: melting temperature). Furthermore, the end piece has a maximum contraction of between 5 and 11% according to the ceramic, which represents a definitive technological advantage over the art.

Such that a preferred aspect of the invention is a ceramic slurry comprising at least one ceramic material in a quantity of 55-80% by weight of the total weight and an organic base comprising a glycol or an ethanolamine, a vinyl resin or polyalkyl carbonate, a phthalate, terpineol, polyolefin, thermoplastic or mixtures thereof.

Another highly preferred aspect is a green body for 3D printing comprising a ceramic material in a quantity of 65-90% and an organic component, wherein said organic component comprises a glycol or an ethanolamine, a vinyl resin or polyalkyl carbonate, a phthalate, terpineol, polyolefin, thermoplastic or mixtures thereof.

A green body suitable for printing must have a certain hardness, typically in the range 5-50 Shore D (ISO 7619-1:2010) and plasticity to facilitate the subsequent extrusion and use thereof in a conventional 3D FDM printer (Prusa Kits or similar).

The green body can be subjected to pre-treatment at 200° C. for 6 hours prior to heating at higher extrusion temperatures. In this manner, solvent and more volatile organic residues are removed, which leaves the final piece free of cracks and other defects arising from the excessively rapid removal of these products.

The method of the invention has been tested with various ceramic materials such as $Al_2O_3$, $ZrO_2$, $CeO_2$ derivatives, TiC, SiC etc., and could be applied to metals, giving rise to high quality filaments, easily stored in coil form and that can be used in conventional 3D FDM printers under standard conditions.

The most preferable aspect is the ceramic filament obtained through the process of the invention, wherein said ceramic material may be any ceramic, and preferably oxides, nitrides and carbides of transition, alkaline, alkaline earth metals and rare earth.

The filaments obtained by the method of the invention have the advantage of supporting a high ceramic load while being manageable and enabling winding for storage thereof. The resulting pieces have a low contraction coefficient and structural and microstructural stability at temperatures of up to 1,600° C.

Both the filaments obtained from the method of the invention and the pieces printed by FDM therefrom have been subjected to thermogravimetric analysis studies, resulting in ceramic loads higher than 65% in all case.

EXAMPLES

The following examples have been provided to illustrate the present invention in a non-limiting manner.

Example 1

Obtainment of a Filament With a 90% Load of Alumina $Al_2O_3$ by Weight

A suspension was prepared using 40% alumina as a ceramic material by weight of the total weight of the suspension in a mixture of ethanol and 2-butanone, in relative proportions of 3:2. Ethylene glycol was added to this mixture as a gelling agent in a proportion of 1:10 by weight of gelling agent:ceramic and kept under magnetic stirring until homogenised for 20 minutes. Binding resin (Polyvinyl butyral Butvar-98, Sigma Aldrich) was added to the resulting gel in a proportion of 1:5 by weight of binder:ceramic, dibutyl phthalate as a plasticizing agent in a proportion of 1:9 by weight of plasticizer:ceramic, together with a small amount of paraffin wax in a proportion of 1:75 by weight of wax:ceramic. The mixture was heated to 150° C. under stirring for 20 minutes. The resulting slurry was cooled to room temperature to obtain a green body with high plasticity and hardness (>35 Shore D according to ISO 7619-1:2010. After the extrusion process, the filaments obtained were dried at 100° C. for 24 hours prior to use in the 3D printer. The same method was repeated using ethanolamine as a gelling agent, yielding identical results. Similarly, the method was repeated using a mixture of 50% dibutyl phthalate and PEG-400 as a plasticizing agent, yielding the same positive results.

This method was repeated without adding any amount of wax to obtain a green body of similar consistency and equal hardness values.

Example 2

Obtainment of a Green Body With an 85% Load of Alumina $Al_2O_3$ by Weight, With Excess Gelling Agent and in the Absence Thereof A suspension was prepared using 50% alumina as a ceramic material by weight of the total weight of the suspension in a mixture of ethanol and 2-butanone, in relative proportions of 3:2. Ethylene glycol was added to this mixture as a gelling agent in a proportion of 1:3 by weight of gelling agent:ceramic and kept under magnetic stirring for 20 minutes until homogenised. Binder resin (Polyvinyl butyral Butvar-98, Sigma Aldrich) was added to the resulting gel in a proportion of 1:6 by weight of binder:ceramic, dibutyl phthalate as a plasticizer in a proportion of 1:6 by weight of plasticizer:ceramic together with paraffin wax in a proportion of 1:75 by weight of wax:ceramic. The mixture was heated to 150° C. under stirring for 20 minutes. The resulting slurry was cooled to room temperature to obtain a green body with high plasticity and very low hardness (<5 Shore D). In this case, the green body swells significantly (>20%) after heat treatment, so that the pieces obtained by 3D printing do not retain the desired shape and dimensions. The same process was repeated omitting the use of the gelling agent and a heterogeneous green, hard (>60 Shore D) and brittle body was obtained, not suitable for extrusion and printing.

Example 3

Obtainment of a Green Body With an 80% Load of Alumina $Al_2O_3$ by Weight, With Excess or Insufficient Binder A suspension was prepared using 50% alumina as a ceramic material by weight of the total weight of the suspension in a mixture of ethanol and 2-butanone, in relative proportions of 3:2. Ethylene glycol was added to this mixture as a gelling agent in a proportion of 1:6 by weight of gelling agent:ceramic and kept under magnetic stirring for 20 minutes until homogenised. Binder resin (Polyvinyl butyral Butvar-98, Sigma Aldrich) was added to the resulting gel in a proportion of 1:2 by weight of binder:ceramic, dibutyl phthalate as a plasticizer in a proportion of 1:6 by weight of plasticizer:ceramic together with a small amount of paraffin wax in a proportion of 1:75 by weight of wax:ceramic. The mixture was heated to 150° C. under stirring for 30 minutes. The resulting slurry was cooled to room temperature to obtain a green body with high plasticity and very high hardness (>70 Shore D) and suitable for extrusion, although the filaments formed were too fragile for use in FDM printers. The same process was repeated for a proportion of binding agent:ceramic of 1.10 by weight, in which case the green body did not retain its initial dimensions after the heat treatment.

Example 4

Obtainment of a Filament With a $TiO_2$ Load of 75% by Weight

A suspension was prepared using 50% $TiO_2$ (anatase, >99%, Sigma Aldrich) as a ceramic material by weight of the total weight of the suspension, dissolved in a mixture of ethanol and 2-butanone, in relative proportions of 2:3. Ethylene glycol was added to this mixture as a gelling agent in a proportion of 1:4 by weight of gelling agent:ceramic and kept under magnetic stirring for 15 minutes until homogenised. Polyvinyl alcohol was added to the resulting gel as a binder resin (Alfa Aesar) in a proportion of 1:3 by weight of binder:ceramic, dibutyl phthalate as a plasticizing agent in a proportion of 1:7 by weight of plasticizer:ceramic together with paraffin wax in a proportion of 1:36 by weight of wax:ceramic. The resulting mixture was heated to 150° C. and kept under stirring for 10 minutes. The resulting slurry was cooled to room temperature to obtain a green body with high plasticity and hardness (20 Shore D). After the extrusion process, the filaments obtained were dried at 100° C. for 24 hours prior to using them in the 3D printer.

Example 5

Obtainment of a Slurry With an 80% Load of 20% Gadolinium-Doped Cerium Oxide (CGO20).

A suspension was prepared using 60% alumina as ceramic material by weight of the total weight of the suspension in a mixture of ethanol and 2-butanone, in relative proportions of 2:3. Methyl cellulose was added to this mixture as a gelling agent in a proportion of 1:10 by weight of gelling agent:ceramic and kept under magnetic stirring for 30 minutes until homogenised. Binder resin (Polyvinyl alcohol, Alfa Aesar) was added to the resulting gel as a binder resin in a proportion of 1:6 by weight of binder:ceramic, dibutyl phthalate as a plasticizing agent in a proportion of 1:6 by weight of plasticizer:ceramic together with a small amount of paraffin wax in a proportion of 1:75 by weight of wax:ceramic. The resulting mixture was heated to 150° C. and kept under stirring for 30 minutes. The resulting slurry was cooled to room temperature, giving rise to a green body with properties combining plasticity and hardness (20 Shore D or higher). The green body was chopped up and fed to an extruder that generated the filament to be used in 3D printing. The process was repeated for other rare earth: Sm, La, Dy with a 5%, 10% and 30% content, respectively, obtaining the same positive result. A positive result is also obtained using undoped cerium oxide.

Example 6

Obtainment of a Slurry With 85% Titanium Carbide and Silicon Carbide

A suspension of titanium carbide (40% by weight) was prepared in a mixture of methanol and 2-pentanone, in relative proportions of 1:1. Methyl cellulose was added to this mixture as a gelling agent in a proportion of 1:9 by weight of gelling agent:ceramic and kept under magnetic stirring for 15 minutes until homogenised. Polyvinyl butyral was added to the resulting gel as a binder resin in a proportion of 1:4 by weight of binder:ceramic, dibutyl phthalate as a plasticizing agent in a proportion of 1:8 by weight of plasticizer:ceramic together with a small amount of paraffin wax (1:75 by weight of wax:ceramic). The resulting mixture was cooled to room temperature to obtain a green body with properties combining plasticity and hardness (50 Shore D). The green body is chopped up and fed to an extruder to generate the filament to be used in the 3D printing process. In another similar example, the same positive results were obtained upon replacing the titanium carbide with silicon carbide.

Example 7

Obtainment of a Slurry With 80% Clay

A suspension of predried red clay (60% by weight) was prepared in a mixture of butanol and 2-butanone in proportions of 2:3. Propylene glycol was added to this mixture as a gelling agent in a proportion of 1:8 by weight of gelling agent:ceramic and kept under magnetic stirring for 30 minutes until homogenised. Polyvinyl acetate (PVA) was added to the resulting gel as a binder resin (1:4 by weight of binder:ceramic), a mixture of 50% dibutyl phthalate and PEG400 as a plasticizing agent (1:8 by weight of plasticizer:ceramic) together with a small amount of paraffin wax (1:36 by weight of wax:ceramic) and was heated to 70° C. under stirring. The case of the clays is particular since it was observed that the removal of solvents at high temperatures gives rise to pre-shaped ceramics that cannot be moulded or subjected to a subsequent extrusion process in the form of a filament. The resulting slurry was cooled to room temperature to obtain a green body with properties combining high plasticity and hardness (30 Shore D or higher). The green body is chopped up and fed to an extruder to generate the filament to be used in 3D printing. The method was repeated, replacing propylene glycol with ethylenediamine as a gelling agent, obtaining the same results.

Example 8

Preparation of a Filament With an 80% Zirconia ($ZrO_2$) Load by Weight

A suspension of zirconia was prepared using 40% $ZrO_2$ as a ceramic material by weight dissolved in a mixture of propyl alcohol and 2-butanone in a relative proportion of 2:3. Ethylene glycol was added to this mixture as a gelling agent in proportions of 1:9 by weight with the ceramic and kept under magnetic stirring for 30 minutes until homogenised. Polyvinyl alcohol (Sigma Aldrich) was added to the resulting gel as a binder resin in a proportion of 1:5 by weight of the ceramic, dibutyl phthalate as a plasticizing agent in proportions of 1:8 with the ceramic together with a small amount of paraffin wax (1:75 with the ceramic) and heated to 150° C. under stirring for 30 minutes. The resulting slurry was cooled to room temperature to obtain a green body which had a high plasticity and hardness (40 Shore D). The method was repeated replacing the zirconia with $Y_{0.08}Zr_{0.92}O_{1.96}$ yttria-stabilised zirconia, obtaining the same positive results.

Example 9

Summary Table of the Successfully Tested Compositions and Conditions

| Ceramic | Solvents | Gelling Agent | Binder | Plasticizer | Wax | Filament |
|---|---|---|---|---|---|---|
| $Al_2O_3$ | 2:3 to 3:2 | 1:6 to 1:9 | 1:3 to 1:8 | 1:6 to 1:9 | 1:75 to 1:200 | OK |
| $Ce_{0.8}Gd_{0.2}O_{1.9}$ | 2:3 to 3:2 | 1:9 to 1:10 | 1:4 to 1:5 | 1:7 to 1:8 | 1:36 to 1:75 | OK |
| $Ce_{0.9}Gd_{0.1}O_{1.95}$ | 2:3 to 3:2 | 1:9 to 1:10 | 1:4 to 1:5 | 1:7 to 1:8 | 1:36 to 1:75 | OK |
| $Ce_{0.9}Sm_{0.1}O_{1.95}$ | 2:3 to 3:2 | 1:9 to 1:10 | 1:4 to 1:5 | 1:7 to 1:8 | 1:36 to 1:75 | OK |
| $Ce_{0.8}Sm_{0.2}O_{1.9}$ | 2:3 to 3:2 | 1:9 to 1:10 | 1:4 to 1:5 | 1:7 | 1:36 to 1:75 | OK |
| TiC | 2:3 to 3:2 | 1:8 | 1:4 | 1:8 | 1:75 | OK |
| SiC | 2:3 to 3:2 | 1:8 | 1:4 | 1:8 | 1:75 | OK |
| $ZrO_2$ | 2:3 to 3:2 | 1:6 to 1:9 | 1:4 | 1:8 | 1:75 | OK |
| YSZ | 2:3 to 3:2 | 1:6 to 1:9 | 1:4 | 1:8 | 1:75 | OK |
| Arcilla | 2:3 | 1:6 to 1:8 | 1:4 | 1:8 | 1:75 | OK |

All ratios make reference to proportion by weight of additive:ceramic.

Example 10

Obtainment of Solid Pieces From the Slurrys Obtained in the Preceding Examples The green body obtained after cooling of the slurrys obtained in Example 1 above was chopped up and fed to an extruder by means of a hopper to obtain filaments with a 90% ceramic load, carrying out the process at 70° C. at a speed of 4 hours/Kg. The resulting filament had a diameter of 1.75 mm and 3.0 mm, depending on the extruder nozzle. Filament fragments 10 mm in length were subjected to heat treatments of up to 1,600° C., maintaining the shape and dimensions of the piece with contractions lower than 10%. The best results were obtained for fragments whose processing had included pretreatment at 200° C. for 6 hours prior to heating at higher extrusion temperatures.

Example 11

Testing of the Pieces

The filament obtained in Examples 1 and 10 was fed to a commercial 3D FDM printer (Prusa Kit) to become a cube with 10 mm edges. Printing was carried out at a temperature of 280° C. A cube with the specified dimensions was obtained that was subjected to a sintering process at 1,500° C. for 24 hours. The resulting pieces retained the dimensions and shape of the initial cube, with a contraction of less than 5% in each of the three dimensions.

Similar processes were carried out with disk, ring and cylinder shapes. Once again, the filament fed to the printer was transformed into the designed objects which, after the sintering process, retained their shape and microstructure with contractions lower than 5%. The study of the microstructure using scanning electron microscopy (SEM) did not reveal any significant changes in the grain size and porosity of the pieces obtained by 3D printing after sintering compared to the pieces obtained by powder compaction and sintering under the same conditions.

The same process was repeated with the filaments resulting from the processes described in Examples 4 to 9, with sintering temperatures of 0.75 $T_m$, giving rise to stable pieces with contractions lower than 15% with respect to those of the green body.

The invention claimed is:
1. A method for obtaining a ceramic slurry for producing a green body and/or a filament for 3D FDM printing, wherein the method comprises the steps of:
   a) preparing a suspension of a ceramic material in at least one alcohol and/or one $C_1$-$C_8$ ketone chain;
   b) adding a polysaccharide, a glycol or an ethanolamine as a gelling agent;
   c) adding a vinyl resin or polyalkyl carbonate as a binder;
   d) adding a phthalate, terpineol, poly:olefin, thermoplastic or mixtures thereof as a plasticizing agent; and
   e) heating at a temperature between 60-150° C.
   to obtain said ceramic slurry;
   wherein
      the ratio of said gelling agent with respect to the ceramic material is between 1:4 and 1:20 by weight;
      the ratio of said binder with respect to the ceramic material is between 1:3 and 1:20 by weight; and
      the ratio of said plasticizing agent with respect to the ceramic material is between 1:5 and 1:10 by weight.

2. The method, according to claim 1, wherein before the heating stage e), paraffin or waxes are added at a ratio of between 1:36 to 1:200 by weight of the ceramic material.

3. The method, according to claim 1 wherein the sequence of any of steps b) to e) changes order or are simultaneous therebetween.

4. The method according to claim 1 wherein the ratio of said gelling agent with respect to the ceramic material is between 1:6 and 1:10 by weight.

5. The method according to claim 1, wherein the ratio of said binder with respect to the ceramic material is between 1:3 and 1:8 by weight.

6. The method according to claim 1, wherein the ratio of said plasticizing agent with respect to the ceramic material is between 1:6 and 1:9 by weight.

7. The method according to claim 1, wherein the ceramic slurry is used for producing a green body for 3D FDM printing.

8. The method according to claim 1, wherein the ceramic slurry is used for producing a filament for 3D FDM printing.

9. A method for producing a filament for 3D FDM printing, wherein said method comprises
   i) obtaining a ceramic slurry by the method as described in claim 1;
   ii) obtaining a green body by cooling the ceramic slurry of stage i); and
   iii) extruding the green body of stage ii).

* * * * *